United States Patent
Dixon

(10) Patent No.: US 7,988,422 B2
(45) Date of Patent: Aug. 2, 2011

(54) WIND TURBINE BLADES WITH IMPROVED BOND LINE

(75) Inventor: Robert Andrew Dixon, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/823,562

(22) Filed: Jun. 25, 2010

(65) Prior Publication Data
US 2011/0142674 A1   Jun. 16, 2011

(51) Int. Cl.
*F01D 5/14* (2006.01)

(52) U.S. Cl. ........... 416/229 R; 29/889.7; 29/889.72; 29/463

(58) Field of Classification Search ............ 416/229 R
See application file for complete search history.

(56) References Cited

U.S. PATENT DOCUMENTS

| | | | |
|---|---|---|---|
| 6,800,956 B2 | 10/2004 | Bartlett | |
| 2007/0036659 A1 | 2/2007 | Hibbard | |
| 2008/0075603 A1 * | 3/2008 | Van Breugel et al. | 416/232 |
| 2010/0296940 A1 * | 11/2010 | Zuteck | 416/226 |

* cited by examiner

*Primary Examiner* — Edward Look
*Assistant Examiner* — Ryan H Ellis
(74) *Attorney, Agent, or Firm* — Dority & Manning, P.A.

(57) ABSTRACT

A wind turbine blade includes an upper shell member and a lower shell member defining an internal cavity therebetween. The shell members are joined with a bond paste along bond lines at the leading edge and trailing edge of the blade. A seal member is disposed between the upper and lower shell members at a designed width of the bond line along at least one of the trailing or leading edges. The seal member has a configuration such that excess flowable bond paste is prevented from migrating past the seal member and into the internal cavity upon mating the upper and lower shell members in assembly of the blade.

18 Claims, 5 Drawing Sheets

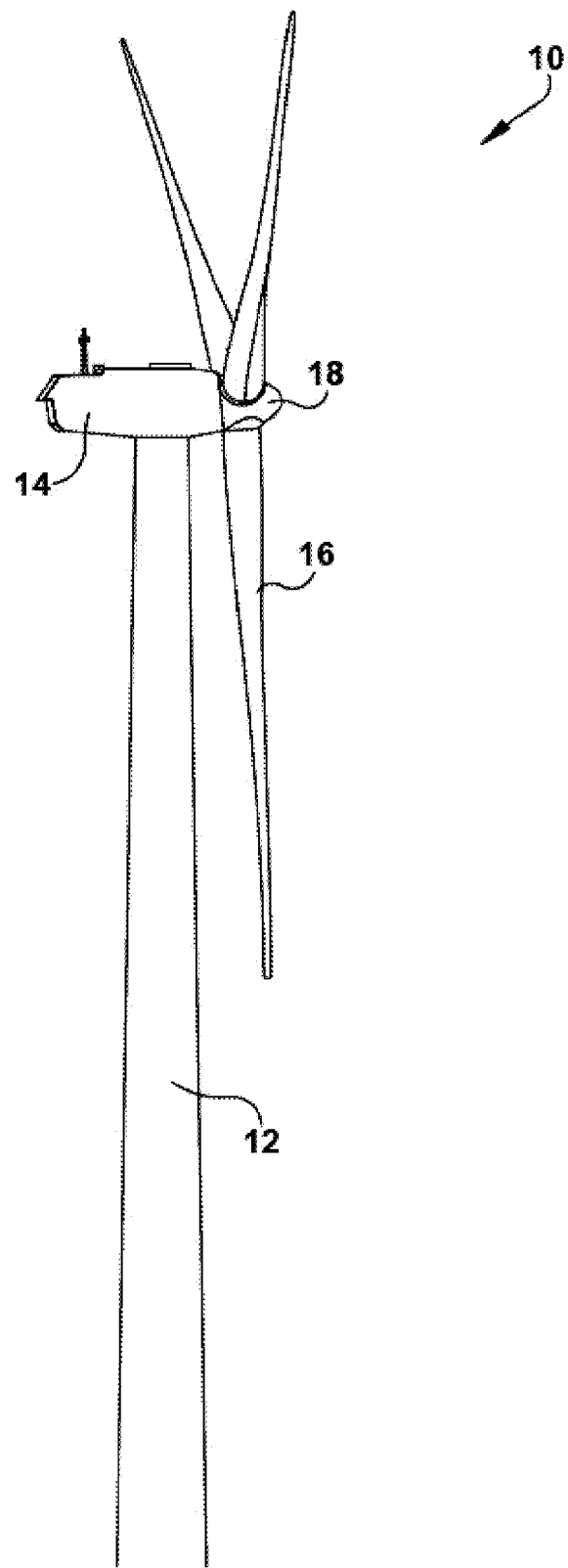
Fig. -1-

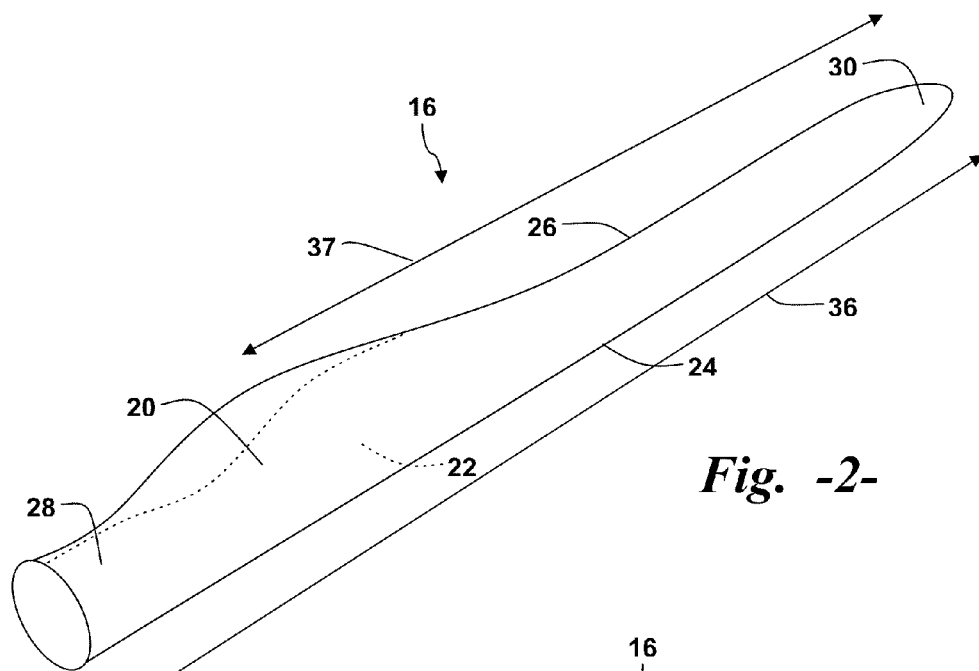
Fig. -2-
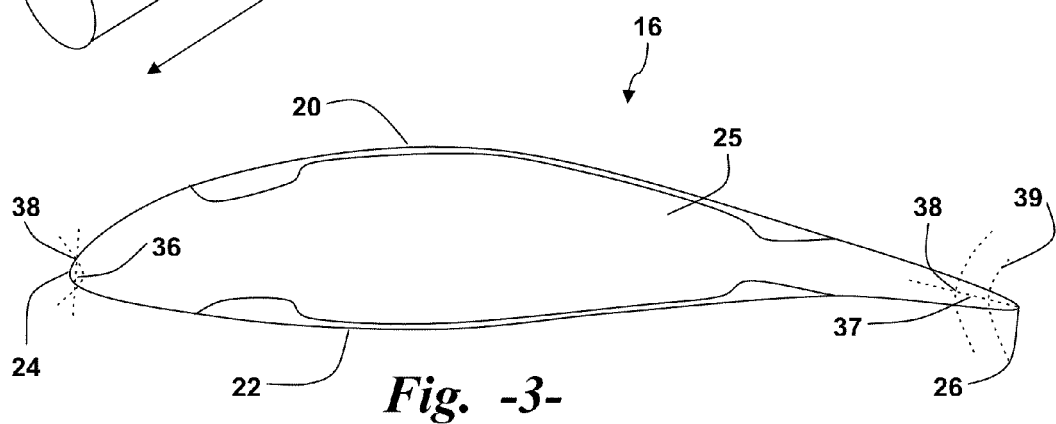
Fig. -3-
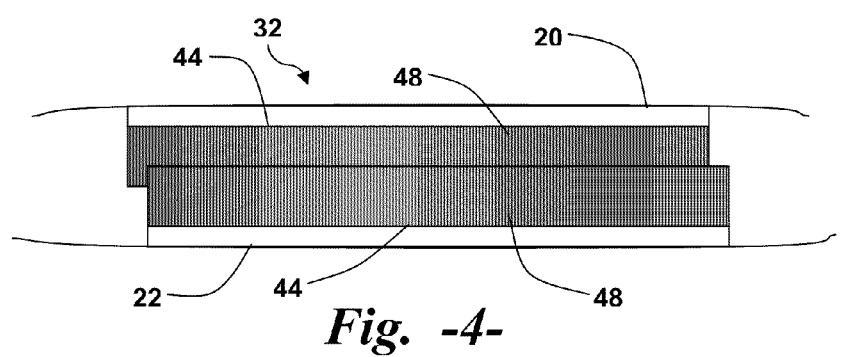
Fig. -4-

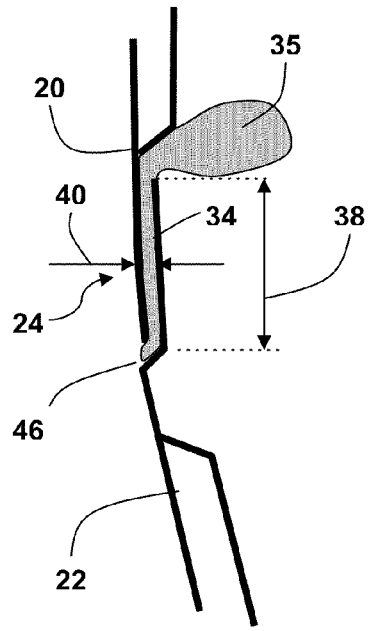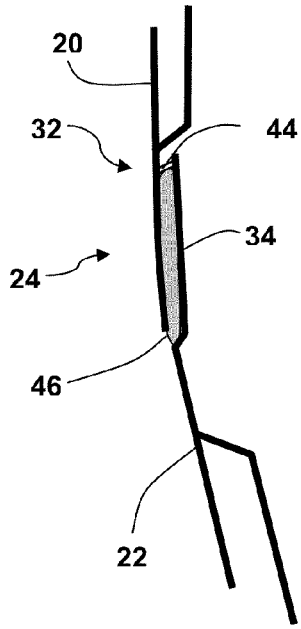
*Fig. -5-*   *Fig. -6-*
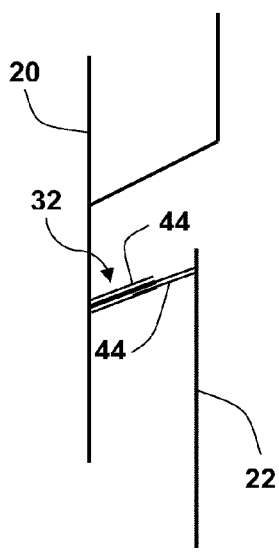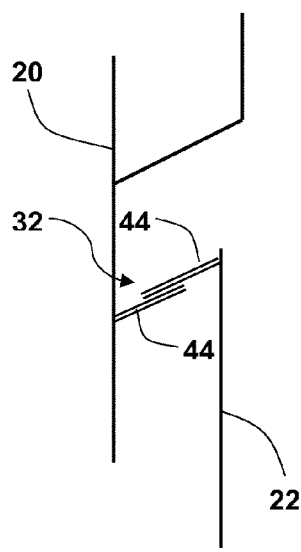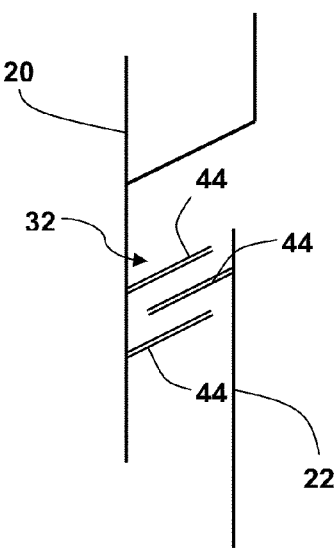
*Fig. -7-*   *Fig. -8-*   *Fig. -9-*

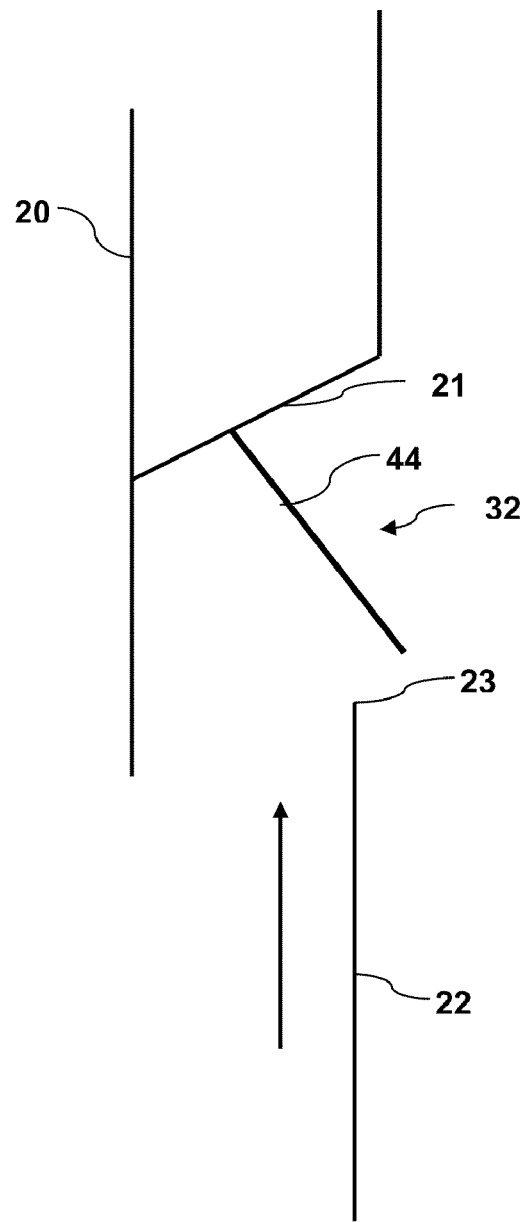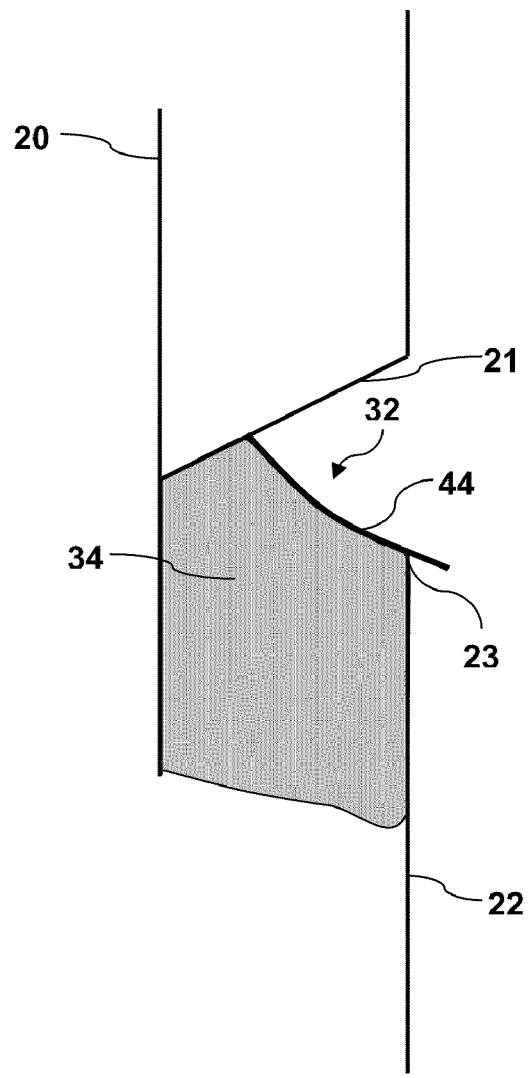
*Fig. -10-*  *Fig. -11-*

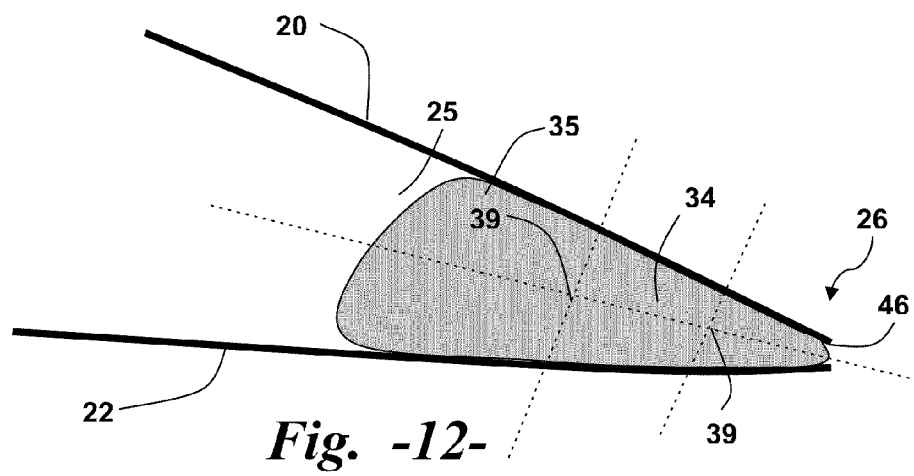
*Fig. -12-*
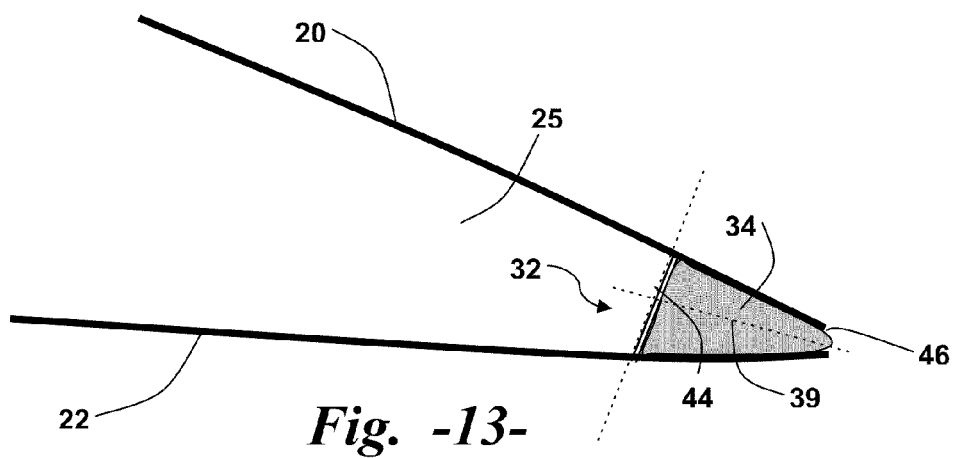
*Fig. -13-*
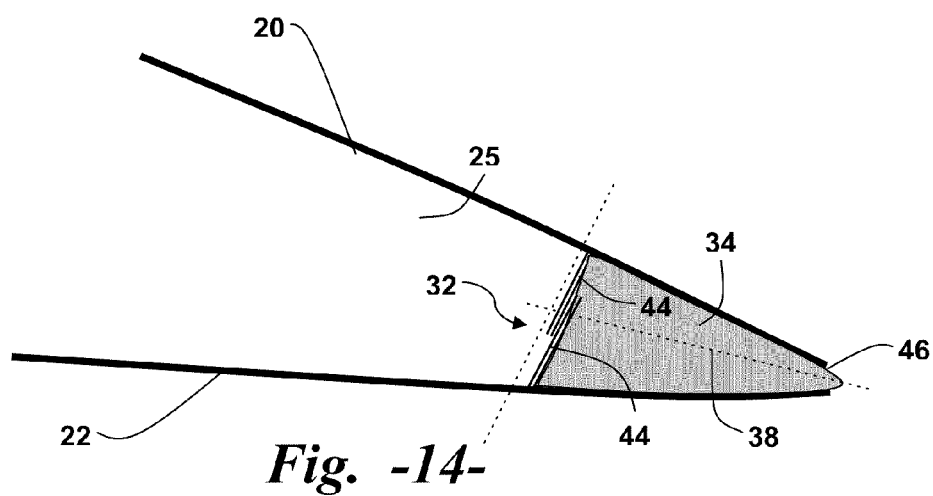
*Fig. -14-*

WIND TURBINE BLADES WITH IMPROVED BOND LINE

FIELD OF THE INVENTION

The present invention relates generally to the field of wind turbines, and more particularly to turbine blades having an improved seal along the leading or trailing edge bonding line.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of an upper (suction side) shell and a lower (pressure side) shell that are bonded together at bond lines along the trailing and leading edges of the blade. The bond lines are generally formed by applying a suitable bonding paste or compound along the bond line at a minimum designed bond width between the shell members. The bond paste, however, tends to migrate well past the designed bond width and into the interior blade cavity. This excess bond paste can add considerable weight to the blade and, thus, adversely affect blade efficiency and overall performance of the wind turbine.

Accordingly, the industry would benefit from an improved bond line configuration that reduces the amount of excess bond paste that migrates into the blade cavity.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided having an upper shell member and a lower shell member defining an internal cavity therebetween. The shell members are joined with a bond paste applied in flowable form along bond lines at a leading edge and a trailing edge of the blade. Along at least one of the trailing or leading edges, a seal member is disposed between the upper and lower shell members at a designed bond width along the bond line. The seal member has a configuration such that excess flowable bond paste is prevented from migrating past the seal member and into the internal cavity upon mating the upper and lower shell members in assembly of the blade. In a particular embodiment, the seal members are provided along both of the leading and trailing edge bond lines.

The seal member may be formed from various types of material or combinations of materials and, in a particular embodiment, is impermeable to the flowable bond paste but air permeable so that any air trapped in the bond line may migrate through the seal member when the upper and lower shells are pressed together.

In particular embodiments, the seal member may be one or a combination of dam members attached to either one or both of the upper or lower shell members. The dam member may be a brush seal in a particularly unique embodiment. The seal member may be a single dam member extending from either of the upper or lower shell members towards the other respective shell member. Alternatively, a dam member may be provided on each of the lower and upper shell members, with the dams intermeshing in one embodiment or overlapping in another embodiment.

The seal member in another embodiment may be a plurality of interlaced dam members that define a tortuous path for flowable bond paste.

The blade may also include a seal gap at the extreme end of the leading or trailing edge opposite from the seal member, with the seal gap providing an opening through which excess flowable bond paste migrates out from the bond line in assembly of the blade.

The invention also encompasses a wind turbine having one or more turbine blades configured with the unique bond line configuration described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of an embodiment of a wind turbine blade in accordance with aspects of the invention;

FIG. 3 is a cross-sectional view of an exemplary wind turbine blade in accordance with aspects of the invention;

FIG. 4 is an end view of an embodiment of a seal member;

FIG. 5 is a side cut-away view of a leading edge bond line configuration;

FIG. 6 is a view of the leading edge bond line configuration of FIG. 5 with a seal member in accordance with aspects of the invention;

FIG. 7 is a side cut-away view of a seal member embodiment at the leading edge of a wind turbine blade;

FIG. 8 is a side cut-away view of an alternate embodiment of a seal member at the leading edge of a wind turbine blade;

FIG. 9 is a side cut-away view of still another embodiment of a seal member at the leading edge of a wind turbine blade;

FIG. 10 is a side cut-away view of a further embodiment of a seal member at the leading unassembled edge of a wind turbine blade;

FIG. 11 is an assembled view of the embodiment of FIG. 10;

FIG. 12 is a side cut-away view of a bond line configuration at the trailing edge of a wind turbine blade;

FIG. 13 is a side cut-away view of a bond line configuration at the trailing edge with a seal member in accordance with aspects of the invention; and, FIG. 14 is a side cut-away view of an alternate seal member configuration at the trailing edge bond line.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 20 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at a bond lines 36 along the leading edge 24 and a bond line 37 at the trailing edge 26. In formation of these bond lines 36, 37, a bond paste 34 (FIG. 5) in flowable viscous form is applied between the mating laminate surfaces of the upper shell member 20 and lower shell member 22 along the length of the bond lines 36, 37. It should be appreciated that the term "bond paste" is used herein in a generic sense to encompass any type of adhesive or bonding material that is applied in an initially flowable state. The particular type of bond paste 34 is not particularly relevant to the present invention, and any suitable type of epoxy, compound, or other material 34 may be used in this regard.

The bond paste 34 is typically applied in a sufficient quantity and pattern so as to establish a designed bond line width 38 at the leading edge 24 and bond line width 37 at the trailing edge 26 that ensures a minimum bonded surface area between the components along the length of the respective bond lines 36, 37. For example, referring to FIG. 5, the leading edge 24 of a turbine blade 26 is depicted. Bond paste 34 is applied between opposite mating laminate surfaces of the upper shell member 20 and lower shell member 22 so as to define a bond having a designed bond width 38 and bond thickness 40. The design criteria for the bond width 38 and thickness 40 may vary between different types of blades based on any combination of design factors, as is well understood by those skilled in the art. For example, referring to FIG. 3, different bond line widths 37 are depicted at the trailing edge 26 of the blade 16.

Referring again to FIG. 5, a particular problem associated with the conventional system and method for application of the bond paste 34 is that excess bond paste is squeezed out from between the mating surfaces of the upper shell member 20 and lower shell member 22 into the internal cavity 25 (FIG. 3) and eventually cures as a hardened mass 35 that adds significant weight to the blade 16. The excess mass bond paste 35 does not add any degree of structural integrity or other useful purpose to the blade 16. In the assembly process, a portion of the excess bond paste 34 may also be squeezed out of the seal gap 46. However, this excess material is easily removed along the length of the leading 24 or trailing edges 36 before it cures.

In order to prevent the situation depicted in FIG. 5, a seal member 32 is disposed between the upper shell member 20 and lower shell member 22 along the bond lines 36. Various examples of a seal member 32 are depicted in FIGS. 4, and 6 through 12, and will be discussed in more detail below. In general, the seal member 32 has a shape and configuration such that excess flowable bond paste 34 is prevented from migrating past the seal member 32 and into the internal cavity 25 upon mating the upper and lower shell members 20, 22 in assembly of the blade 16, as depicted in FIG. 6. In essence, the seal member 32 acts as a dam to the flowable bond paste 34 and, thus, forces any excess bond paste 34 to migrate out from between the shell members 20, 22 through the seal gap 46, wherein the excess material is easily removed.

Desirably, the seal member 32 is provided along each of the leading edge 24 and trailing edge 36. However, it is also within the scope and spirit of the invention to include the seal member 32 along only one of the bond lines 36 at the leading edge 24 or trailing edge 26.

The seal member 32 may be formed from any type of suitable material or combinations of materials. The seal member 32 may be permeable to air yet impermeable to migration of the flowable bond paste 34. In this manner, any air that is forced out from between the mating surfaces of the upper 20 and lower 22 shell members is able to escape through the seal member 32 while the flowable bond paste 34 is forced out through the seal gap 46.

A particular embodiment of a seal member 32 is depicted in FIG. 4 wherein the seal member 32 includes a dam member 44 attached to each of the upper and lower shell members 20, 22. Referring to FIG. 3, the dam members 44 would be located at the designed bond line width 38. In the embodiment depicted in FIG. 4, each of the dam members 44 is a brush-type seal wherein a plurality of relatively tightly spaced bristles extend along the longitudinal length of the respective dam members 44. The bristles allow air to pass through the respective dam members 44 while preventing migration of the bond paste 34 through the members. The brush seals may overlap, as depicted in FIG. 4, intermesh, or otherwise engage in any other fashion.

It should be appreciated that a single dam member 44 in the form of a brush seal may also be utilized wherein the brush seal has a configuration so as to extend from one of the shell members 20, 22 to the opposite shell member 22, 20.

FIG. 7 illustrates an alternative embodiment of a seal member 32 wherein a plurality of dam members 44 are provided and intermesh with each other. For example, the dam member 44 attached to the laminate portion of the lower shell member 22 intermeshes into the dam member 44 attached to the laminate portion of the upper shell member 20. In this particular embodiment 20, the dam members 44 may be brush seals wherein the bristles are able to penetrate into the bristles of the opposite brush seal. In an alternative embodiment, the dam members 44 may be relatively solid members, wherein one of the dam members 44 defines a slot or other type of receiving channel for receipt of the opposite dam member 44.

FIG. 8 illustrates yet another embodiment of a seal member 32 wherein a dam member 44 on the laminate portion of each of the upper and lower shell members 20, 22 extend towards each other and overlap. The dam members 44 may contact each other at the overlapping portion, or may be spaced from each other. With this particular embodiment, the dam members 44 may be more rigid or solid members that are attached or otherwise directly and integrally formed in the respective shell members 20, 22.

FIG. 9 illustrates yet another alternative embodiment of a seal member 32 wherein a plurality of spaced apart dam members 44 are provided. The dam members 44 define a "tortuous" path for flowable bond paste 34. For example, referring to FIG. 9, it should be readily appreciated that any flowable bond paste 34 would need to move through a serpentine path before escaping into the internal cavity of the blade. The term "tortuous" is used herein to describe any path having multiple changes of direction so as to inhibit flow of the bond paste 34 completely through the dam members 44.

FIGS. 10 and 11 depict an embodiment wherein the dam member 44 is attached to the upper shell member 20, for example to the slanted laminate face 21, at a location and orientation so as to be engaged by a leading end 23 of the lower shell member 22 when the components are assembled together, as depicted by the arrow in FIG. 10. The dam member 44 may be a resilient brush seal. FIG. 11 shows the lower shell member 22 moved into its assembled position relative to the upper shell member 20. The dam member is engaged (and may be deflected) by the end 23 of the lower shell member 22 so as to essentially seal off the gap between the components. Desirably, the dam member 44 is resilient and remains biased against the end 23 of the lower shell member 22. The flowable bond paste 34 is injected between the shell members 20, 22 to provide the desired seal thickness and width. The embodiment of FIGS. 10 and 11 may be desired for its simplicity and ease of assembly of the shell members 20, 22.

FIG. 12 depicts a bond between the upper and lower shell members 20, 22 at the trailing edge 26 of a blade. Different bond line widths 39 are depicted in the figure. Excess bond paste 35 extends beyond either of the bond line width dimensions 39 and is problematic for the reasons discussed above.

FIG. 13 illustrates a seal member 32 between the upper and lower shell members 20, 22 at the trailing edge in the form of a single dam member 44. As discussed above, this dam member 44 may be a brush seal, a solid and rigid material, or any other suitable type of dam material. The single dam member 44 may extend from either of the shell members 20, 22 towards the opposite shell member. As can be seen in FIG. 11, the dam member 44 is disposed at the designed dimension of the bond line width 39 and prevents the formation of excess bond material in the internal cavity 25.

FIG. 14 illustrates the seal member 32 at the greater of the bond line widths 38. In this embodiment, the seal 32 is defined by multiple dam members 44, with at least one dam member 44 extending from each of the upper 20 and lower 22 shell members.

It should be appreciated that any of the embodiments discussed above with respect to FIGS. 7 through 11 may be utilized at the bond line 37 along the trailing edge bond 26 of FIGS. 13 and 14.

Because the dam member 44 defines a barrier to flow of the bond paste 34 into the internal cavity 25 of the blade 16, the present invention may provide the additional benefit that the viscosity of the bond paste 34 may be increased or otherwise modified to ensure a more complete application and elimination of air pockets or voids between the shell members along the bond line without the concern that a more viscous paste would more readily migrate into the cavity 25.

The present invention also encompasses any configuration of a wind turbine 10 (FIG. 1) wherein at least one of the blades 16 is configured with the unique advantages of the invention as discussed above.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, said blade comprising:
   an upper shell member and a lower shell member defining an internal cavity therebetween;
   said upper and lower shell members joined with a bond paste along bond lines at a leading edge and a trailing edge of said blade;
   an air permeable seal member disposed between said upper and lower shell members at a designed width of said bond line along at least one of said trailing or leading edges;
   said seal member having a configuration such that excess flowable bond paste is prevented from migrating past said seal member and into said internal cavity upon mating said upper and lower shell members in assembly of said blade.

2. The wind turbine blade as in claim 1, comprising said seal member along each of said leading and trailing edges.

3. The wind turbine blade as in claim 1, wherein said seal member comprises a brush seal attached to either one or both of said upper or lower shell members and extending towards the opposite respective said lower or upper shell member.

4. The wind turbine blade as in claim 1, wherein said seal member comprises a dam on each of said lower and upper shell members, said dams intermeshing.

5. The wind turbine blade as in claim 1, wherein said seal member comprises a dam on each of said lower and upper shell members, said dams overlapping.

6. The wind turbine blade as in claim 1, wherein said seal member comprises a single dam member.

7. The wind turbine blade as in claim 1, wherein said seal member comprises a plurality of interlaced dam members defining a tortuous path for flowable bond paste.

8. The wind turbine blade as in claim 1, further comprising a seal gap at said leading or trail edge opposite from said seal member, said seal gap providing an opening through which excess flowable bond paste migrates out from said bond line during assembly of said blade.

9. The wind turbine blade as in claim 1, wherein said seal member comprises a dam member extending from said upper shell member at a location and orientation so as to be engaged and deflected by a leading end of said lower shell member.

10. The wind turbine blade as in claim 9, wherein said dam member is biased against said leading end of said lower shell member.

11. A wind turbine, said wind turbine comprising a plurality of turbine blades, at least one of said turbine blades comprising:
    an upper shell member and a lower shell member defining an internal cavity therebetween;
    said upper and lower shell members joined with a bond paste along bond lines at a leading edge and a trailing edge of said blade;
    an air permeable seal member disposed between said upper and lower shell members at a designed width of said bond line along at least one of said trailing or leading edges;
    said seal member having a configuration such that excess flowable bond paste is prevented from migrating past said seal member and into said internal cavity upon mating said upper and lower shell members in assembly of said blade.

12. The wind turbine as in claim 11, comprising said seal member along each of said leading and trailing edges of said turbine blade.

13. The wind turbine as in claim 11, wherein said seal member comprises a brush seal attached to either one or both of said upper or lower shell members and extending towards the opposite respective said lower or upper shell member.

14. The wind turbine as in claim 11, wherein said seal member comprises a dam on each of said lower and upper shell members, said dams intermeshing.

15. The wind turbine as in claim 11, wherein said seal member comprises a dam on each of said lower and upper shell members, said dams overlapping.

16. The wind turbine as in claim 11, wherein said seal member comprises a single dam member.

17. The wind turbine as in claim 11, wherein said seal member comprises a plurality of interlaced dam members defining a tortuous path for flowable bond paste.

18. The wind turbine as in claim 11, further comprising a seal gap at said leading or trail edge opposite from said seal member, said seal gap providing an opening through which excess flowable bond paste migrates out from said bond line during assembly of said blade.

* * * * *